H. C. MARMON.
AUTOMOBILE AXLE.
APPLICATION FILED OCT. 15, 1914.
1,146,008.
Patented July 13, 1915.
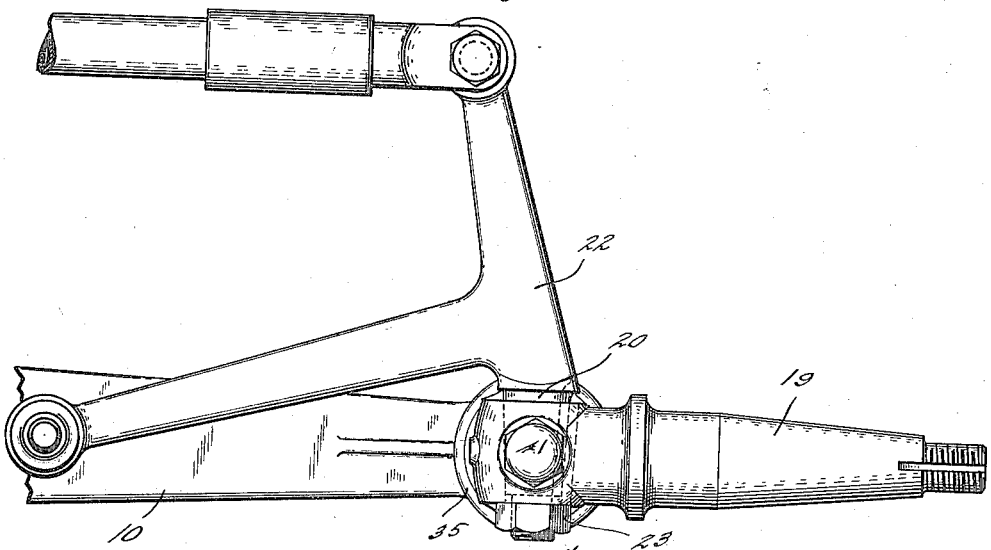
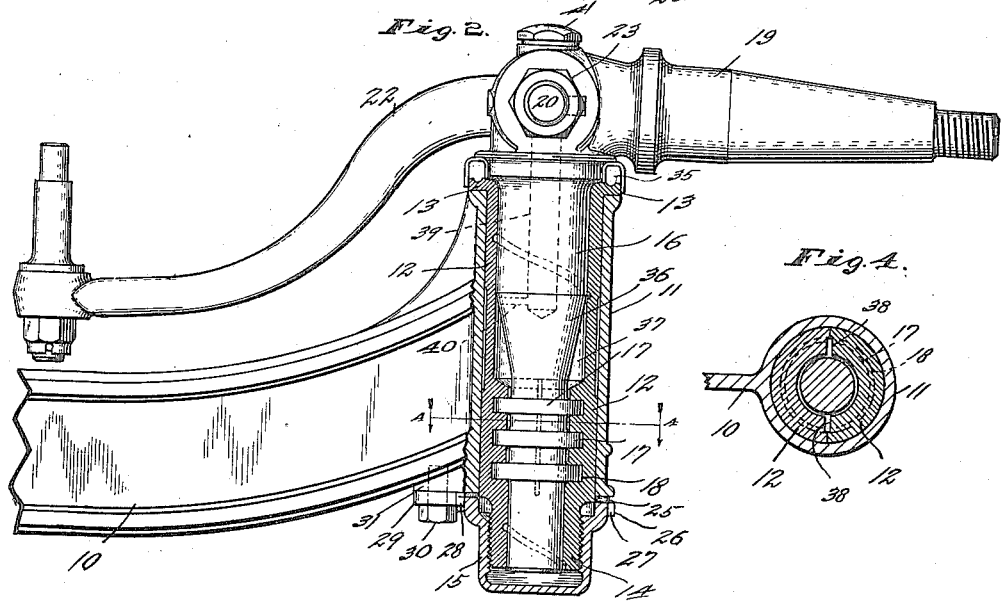
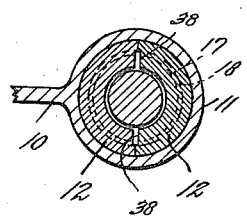
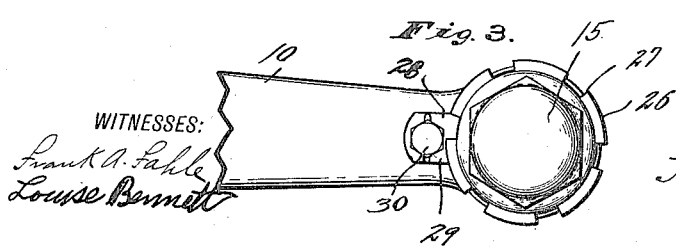
WITNESSES:
Frank A. Fahle
Louise Bennett
INVENTOR
Howard C. Marmon,
BY
Hood & Schley
ATTORNEYS

UNITED STATES PATENT OFFICE.

HOWARD C. MARMON, OF INDIANAPOLIS, INDIANA.

AUTOMOBILE-AXLE.

1,146,008.     Specification of Letters Patent.     Patented July 13, 1915.

Application filed October 15, 1914. Serial No. 866,803.

*To all whom it may concern:*

Be it known that I, HOWARD C. MARMON, a citizen of the United States, residing at Indianapolis, in the county of Marion and State of Indiana, have invented a new and useful Automobile-Axle, of which the following is a specification.

It is the object of my invention to provide a mounting for steering knuckles, as for automobiles, which shall be simple and inexpensive to produce and strong and accurate in service.

The accompanying drawing illustrates my invention.

Figure 1 is a plan view of one end of the front axle of an automobile, provided with my improved steering knuckle mounting. Fig. 2 is an elevation of such axle end, with some of the parts in section; Fig. 3 is a partial bottom view of such axle end; and Fig. 4 is a section on the line 4—4 of Fig. 2.

The front axle 10 is provided at each end with an integral tubular bearing pocket or sleeve 11, which is usually vertical or nearly so. Within the bearing pocket or sleeve 11 are mounted two mating half bushings 12 which when put together form a complete bushing fitting within the bearing pocket 11. These half bushings are provided at their top with flanges 13 which extend over and bear against the upper end of the bearing pocket or sleeve 11, and the lower ends of the two bushings together form a stud 14 which projects below the bottom of the bearing pocket 11 and is threaded to receive a cap 15 which bears against the lower end of the sleeve 11 so that the flange 13 and cap 15 hold the half bushings 12 firmly in place in the bearing pocket 11. Rotatably mounted within the bushing 12 is the spindle 16 of the steering knuckle, which spindle has one or more integral circumferential flanges 17 which fit into corresponding grooves 18 in the two mating half bushings 12, so that when the flanges 17 are in the groove 18 the spindle 16 is locked against axial movement within such bushing. The upper end of the spindle 16 is integrally connected to a laterally projecting stub axle 19 for receiving the vehicle wheel, and the member 16—19 is perforated at the junction of such two parts to receive a projecting pin 20 on an arm 22 for suitable connection to the steering control device in any suitable manner, the pin 20 being held in place by a nut 23.

In assembling the device, the spindle 16 is placed between the two mating half bushings 12, and then the spindle and half bushings are inserted as a unit into the bearing pocket 11, which clamps the half bushings upon the spindle. The cap 15 is now screwed in place on the plug 14 to lock the half bushings in place in the bearing pocket. The spindle is now held definitely in place in all directions save for a rotary movement about its axis.

If desired, a washer 25 of some soft metal may be placed between the cap 15 and the lower end of the bearing pocket 11, and such cap 15 may have a flange 26 provided with a number of peripheral pockets 27 for coöperating with the tongue 28 of a nut-locking plate 29 clamped by a screw 30 to a lug 31 on the under side of the axle 10.

If desired, a suitable dust guard 35 may surround the joint between the upper end of the spindle 16 and the upper end of the bushings 13, the washer 25 serving effectively as a dust guard at the lower end of the spindle. Furthermore, if desired an intermediate portion 36 of the spindle 16 may be spaced from the surrounding bushing to provide an oil pocket 37, from which slots 38 formed between the two half bushings 12 lead to various grooves 18. Oil or other lubricant is supplied to the oil pocket 37 by a hole 39 which extends axially along the spindle 16 from the top thereof to the portion 36, this hole 39 communicating with the oil pocket 37 by a lateral opening 40. The upper end of the hole 39 is closed by a suitable cap 41.

I claim as my invention:

1. An axle having a tubular bearing sleeve at its end, a split bushing within said bearing sleeve, a steering knuckle having a spindle fitting in said bushing, said bushing and spindle having interfitting portions for preventing relative axial movement between them, and means for clamping said bushing in said bearing sleeve, said means when released permitting the bushing to be removed axially from said bearing sleeve with no relative turning between the bushing and bearing sleeve.

2. An axle having a bearing pocket at its end, a bushing split into a plurality of parts and fitting within said bearing pocket, said bushing having at one end a part for bearing against the corresponding end of the bearing pocket and at the other a projecting plug, a cap removably mounted on said plug and bearing against the other end of said bearing pocket, said cap and plug having a screw connection, means for locking said cap against turning, and a steering knuckle having a spindle fitting in said bushing, said spindle and bushing having interdigitating portions for preventing relative axial movement between them.

3. An axle having a bearing pocket at its end, a bushing split into a plurality of parts and fitting within said bearing pocket, said bushing having at one end a part for bearing against the corresponding end of the bearing pocket and at the other a projecting plug, a cap removably mounted on said plug and bearing against the other end of said bearing pocket, and a steering knuckle having a spindle fitting in said bushing, said spindle and bushing having interdigitating portions for preventing relative axial movement between them.

4. An axle having a bearing pocket at its end, a bushing split into a plurality of parts and fitting within said bearing pocket, said bushing having at one end a part for bearing against the corresponding end of the bearing pocket and at the other a projecting plug, a cap removably mounted on said plug and bearing against the other end of said bearing pocket, said cap and plug having a screw connection, and a steering knuckle having a spindle fitting in said bushing, said spindle and bushing having interdigitating portions for preventing relative axial movement between them.

5. An axle having a bearing pocket at its end, a pair of mating half bushings fitting in said bearing pocket, means for clamping said half bushings in place in said bearing pocket, said means when released permitting half bushings to be removed from the bearing pocket with no relative turning between the half bushings and bearing pocket, a steering knuckle having a spindle which extends downward into said half bushings and interlocks therewith against relative axial movement while permitting relative rotary movement, said steering knuckle also having a wheel-carrying lateral spindle projecting from the upper end of said first-named spindle.

6. An axle having a bearing pocket at its end, a pair of mating half bushings fitting in said bearing pocket, means for clamping said half bushings in place in said bearing pocket, a steering knuckle having a spindle which extends downward into said half bushings and interlocks therewith against relative axial movement while permitting relative rotary movement, said steering knuckle also having a wheel-carrying lateral spindle projecting from the upper end of said first-named spindle, and said first spindle and said half bushings having engagement for sufficient axial length so that such bushing and bearing pocket furnish the sole support for said steering knuckle.

In witness whereof, I have hereunto set my hand at Indianapolis, Indiana, this 22nd day of September, A. D. one thousand nine hundred and fourteen.

HOWARD C. MARMON.

Witnesses:
FRANK A. FAHLE,
LOUISE BENNETT.

Copies of this patent may be obtained for five cents each, by addressing the "Commissioner of Patents. Washington, D. C."